(12) United States Patent
Lin

(10) Patent No.: US 12,498,023 B1
(45) Date of Patent: Dec. 16, 2025

(54) ELECTRIC CYLINDER WITH REMINDER FUNCTION AND QUICK-RELEASE STRUCTURE THEREOF

(71) Applicant: TIMOTION TECHNOLOGY CO., LTD., New Taipei (TW)

(72) Inventor: Yu-Chang Lin, New Taipei (TW)

(73) Assignee: TIMOTION TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 19/051,205

(22) Filed: Feb. 12, 2025

(30) Foreign Application Priority Data

Dec. 3, 2024 (TW) ................................. 113213292

(51) Int. Cl.
  *F16H 25/24* (2006.01)
  *F16H 25/20* (2006.01)

(52) U.S. Cl.
  CPC ....... *F16H 25/2015* (2013.01); *F16H 25/205* (2013.01); *F16H 25/24* (2013.01); *F16H 2025/209* (2013.01)

(58) Field of Classification Search
  CPC .... F16H 25/2015; F16H 25/205; F16H 25/24; F16H 2025/209
  See application file for complete search history.

(56) References Cited

U.S. PATENT DOCUMENTS

| | | | |
|---|---|---|---|
| 12,038,071 B2* | 7/2024 | Xu | H02K 7/06 |
| 2008/0210029 A1* | 9/2008 | Wang | F16H 25/20 74/89.38 |
| 2012/0227522 A1* | 9/2012 | Wu | F16H 25/20 74/89.14 |
| 2014/0312724 A1* | 10/2014 | Hung | F16H 25/20 310/78 |
| 2014/0345404 A1* | 11/2014 | Wu | F16D 11/10 74/405 |
| 2018/0238426 A1* | 8/2018 | Hung | F16H 25/2454 |
| 2019/0195323 A1* | 6/2019 | Lu | F16H 25/2454 |
| 2020/0008991 A1* | 1/2020 | Wu | H02K 7/06 |
| 2022/0412441 A1* | 12/2022 | Xu | H02K 7/06 |
| 2023/0047312 A1* | 2/2023 | Lin | F16H 25/2454 |
| 2024/0117866 A1* | 4/2024 | Knoell | F16H 25/2454 |

\* cited by examiner

*Primary Examiner* — Farhana Pervin
(74) *Attorney, Agent, or Firm* — HDLS IPR SERVICES; Chun-Ming Shih

(57) ABSTRACT

An electric cylinder (10) with a reminder function and a quick-release structure (2) thereof. The electric cylinder (10) includes a worm wheel (21). The quick-release structure (2) includes a clutch (22), a clutch plate (23), a linkage rod component (3), a position sensor (4), and an alarm (5). The clutch plate (23) is connected to the worm wheel (21). The linkage rod component (3) includes a pullable part (31) disposed on one end thereof. The linkage rod component (3) includes a sliding block (32) disposed between the pullable part (31) and the clutch plate (23). The position sensor (4) is disposed corresponding to the sliding block (32), and configured to sense a movement of the sliding block (32) and generate a displacement signal. The alarm (5) is configured to receive the displacement signal and send a warning.

16 Claims, 12 Drawing Sheets

ELECTRIC CYLINDER WITH REMINDER FUNCTION AND QUICK-RELEASE STRUCTURE THEREOF

BACKGROUND OF THE DISCLOSURE

Technical Field

The present disclosure relates to a structure of an electric cylinder, particularly relates to an electric cylinder with a reminder function and a quick-release structure thereof.

Description of Related Art

An electric cylinder (linear actuator) is installed on an electric hospital bed, a treadmill, a wheelchair, etc. to adjust a height or an elevation angle. During the first aid treatment of a patient, a quick-release structure is generally used to quickly release the electric cylinder, so that the hospital bed may quickly return to a flat state to gain the most precious gold rescue time.

However, during the quick-release process of the electric cylinder, the hospital bed may fall rapidly in a very short period of time, and an impact generated may easily cause panic in the patient. Therefore, activating an early warning function before the quick-release of the electric cylinder to improve its safety is a research and development focus of the electric cylinder manufacturers.

In view of that, the creator has been studying that related-arts and trying to solve those problems with the application of theories, which has become the goal of the creator's improvement.

SUMMARY OF THE DISCLOSURE

The present disclosure provides an electric cylinder with a reminder function and a quick-release structure thereof. A pullable part may drive a sliding block to move through a linkage rod component and drive a clutch plate to separate from a clutch. A position sensor senses a movement of the sliding block and generates a displacement signal. An alarm receives the displacement signal and sends a warning. As a result, the electric cylinder and the quick-release structure with the function of starting an early warning before the quick-release of the present disclosure may be achieved In the embodiment of the present disclosure, the present disclosure provides a quick-release structure with a reminder function, disposed on an electric cylinder, the electric cylinder including a case, a lead screw, a worm gear, and a worm wheel, the worm wheel disposed on a terminal of the lead screw and engaging with the worm gear, the quick-release structure including: a clutch, adapted to sheathe and fix the lead screw, and configured to rotate with the lead screw; a clutch plate, configured to connect to the worm wheel, rotate with the worm wheel, and relatively move to the clutch to connect or separate from the clutch; a linkage rod component, movably disposed on the case and including a pullable part disposed on one end thereof, another end of the linkage rod component fixed on the clutch plate, the linkage rod component including a sliding block disposed between the pullable part and the clutch plate, the pullable part configured to drive the sliding block to move through the linkage rod component and drive the clutch plate to separate from the clutch; a position sensor, disposed corresponding to the sliding block, and configured to sense a movement of the sliding block and generate a displacement signal; and an alarm, configured to receive the displacement signal and send a warning.

In the embodiment of the present disclosure, the present disclosure provides an electric cylinder with a reminder function, including: an electric cylinder main body including a case and an electric motor, a lead screw, and a worm wheel disposed in the case, the electric motor including a worm gear, the worm wheel disposed on a terminal of the lead screw and engaging with the worm gear; and a quick-release structure, including: a clutch, adapted to sheathe and fix the lead screw, and configured to rotate with the lead screw; a clutch plate, configured to connect to the worm wheel, rotate with the worm wheel, and relatively move to the clutch to connect or separate from the clutch; a linkage rod component, movably disposed on the case and including a pullable part disposed on one end thereof, another end of the linkage rod component fixed on the clutch plate, the linkage rod component including a sliding block disposed between the pullable part and the clutch plate, the pullable part configured to drive the sliding block to move through the linkage rod component and drive the clutch plate and worm wheel to separate from the clutch; a position sensor, disposed corresponding to the sliding block, and configured to sense a movement of the sliding block and generate a displacement signal; and an alarm, configured to receive the displacement signal and send a warning.

In summary, the process of the pullable part being pulled may be performed through the linkage rod component driving the sliding block to move, and then driving the clutch plate and the clutch to separate from each other. Before a rocker arm is moved to separate the clutch plate and the clutch from each other, the position sensor senses the movement of the sliding block and generates a displacement signal and the alarm receives the displacement signal and sends a warning immediately. As a result, the electric cylinder and the quick-release structure with the function of starting an early warning before the quick-release of the present disclosure may be achieved

DETAILED DESCRIPTION

Figure 1:
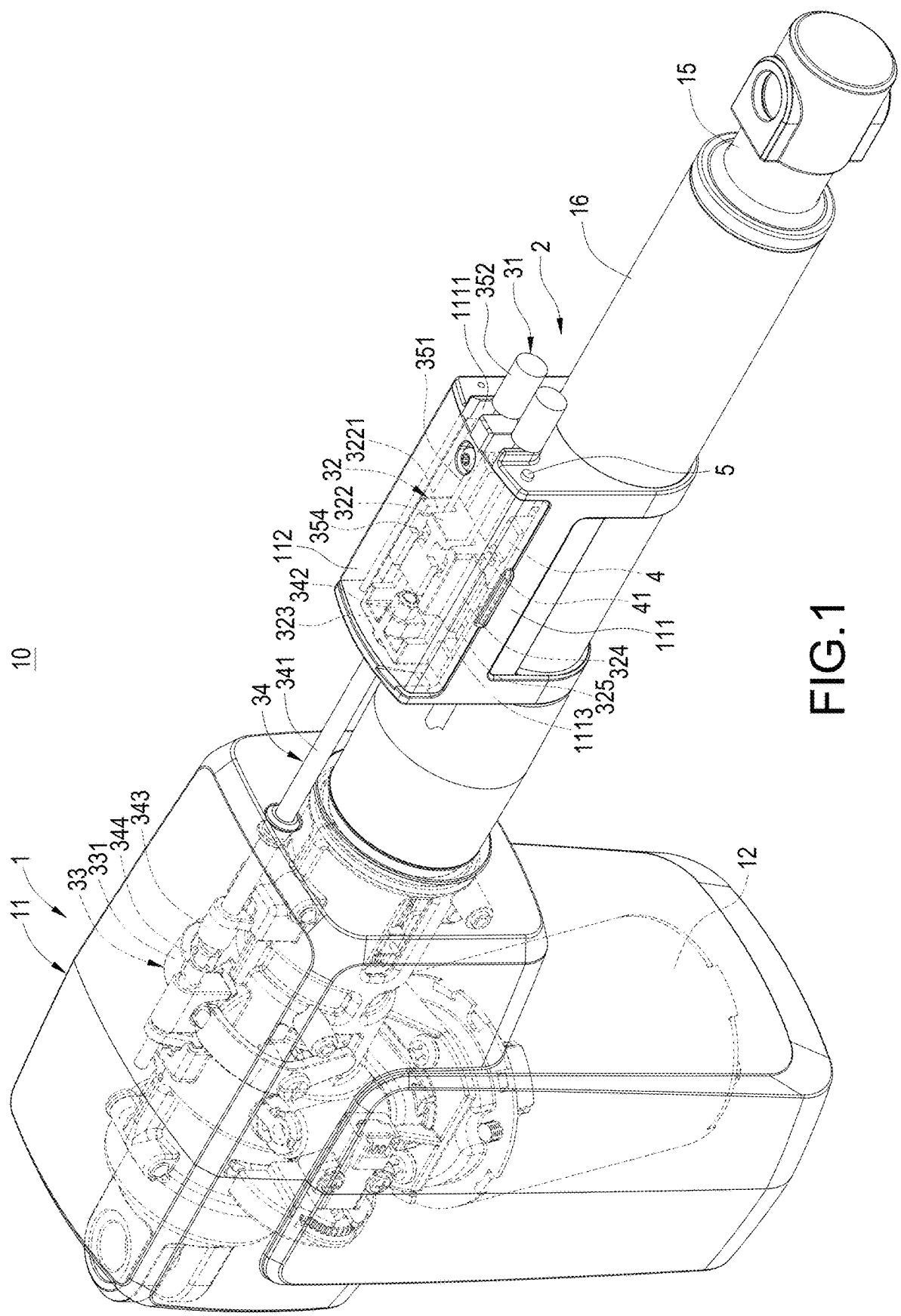
FIG. 1 is a perspective diagram of the assembled electric cylinder in accordance with the present disclosure.
Figure 2:
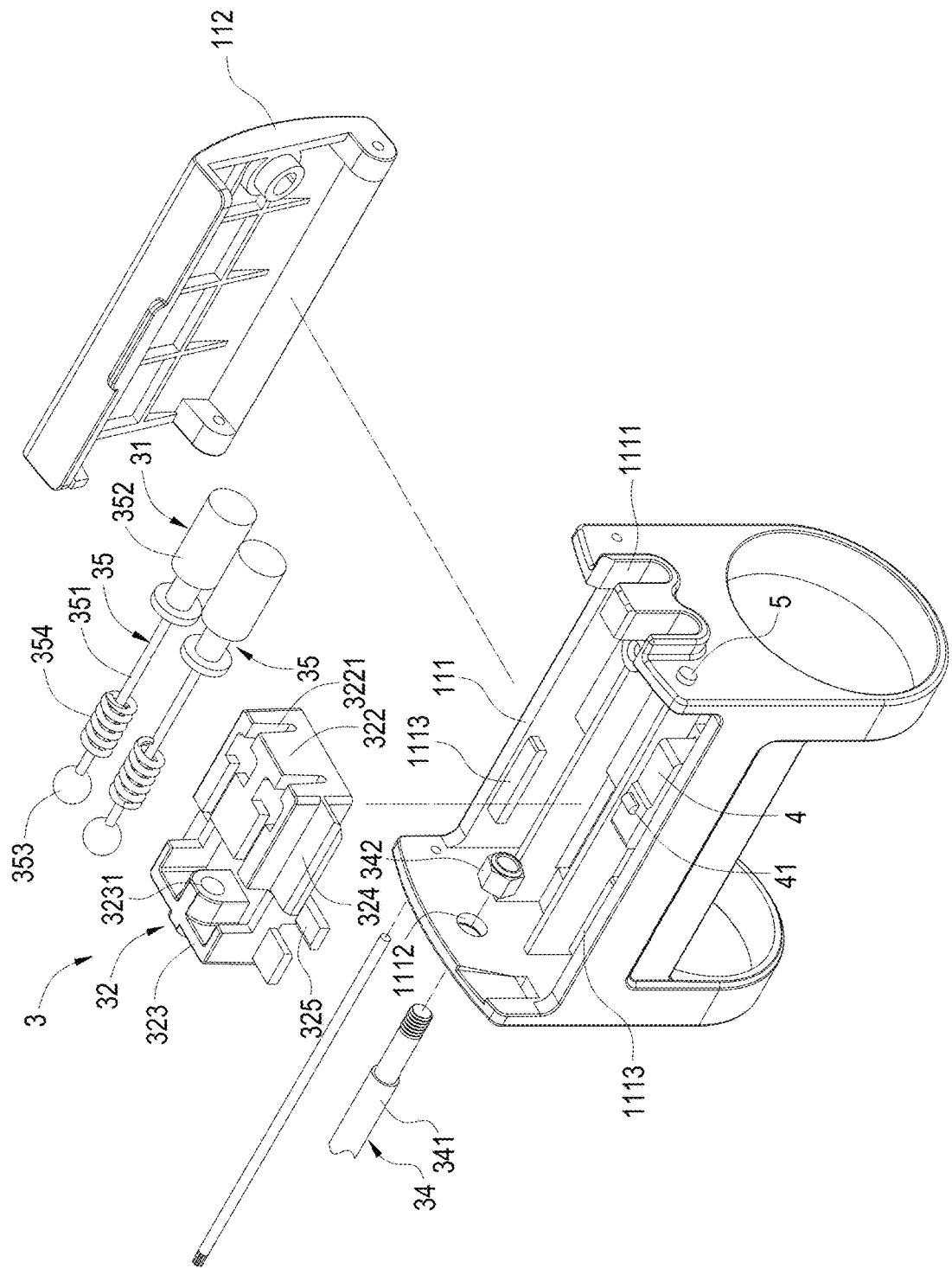
FIG. 2 is a perspective exploded diagram of the linkage rod component, the position sensor, and the case in accordance with the present disclosure.
Figure 3:
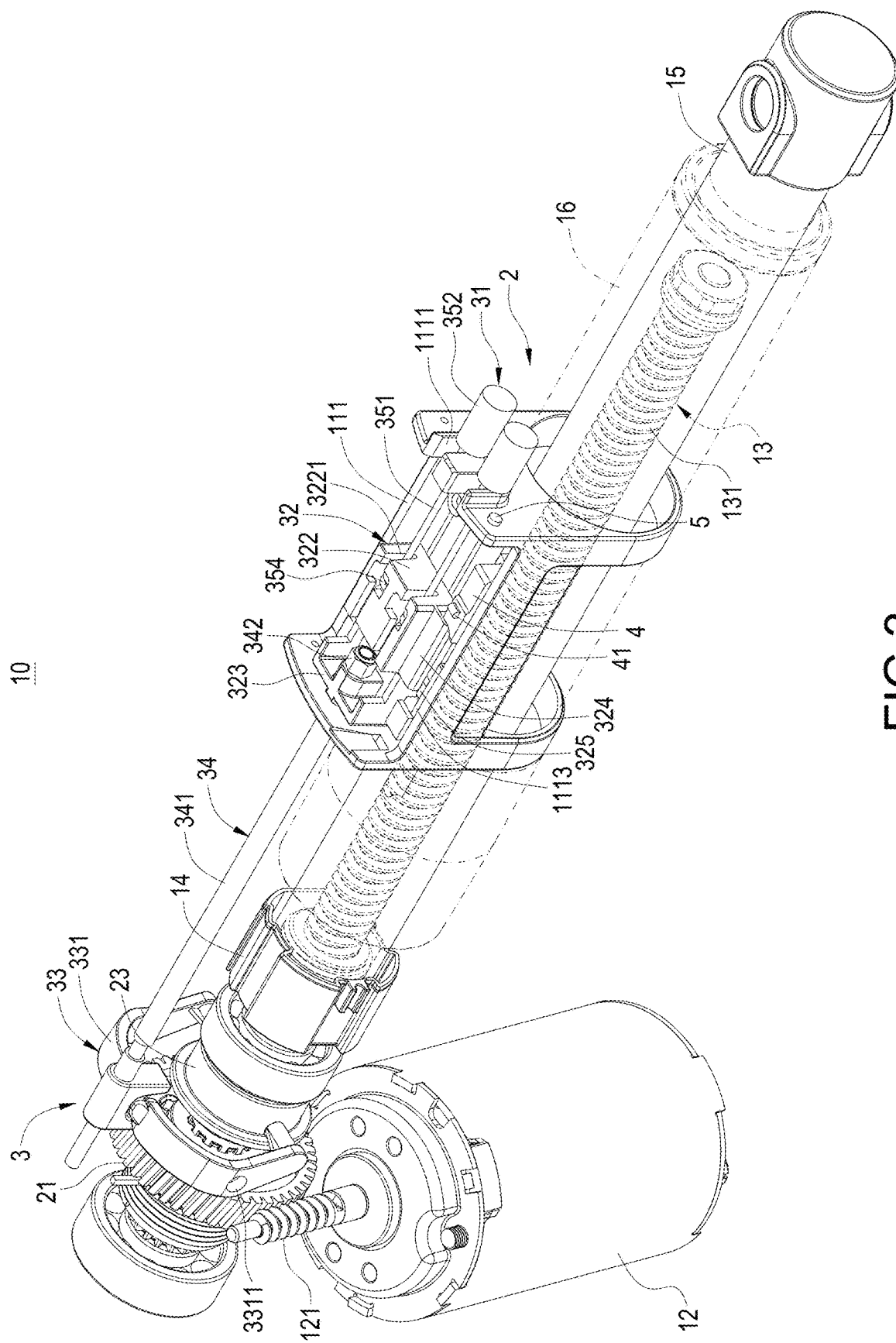
FIG. 3 is another perspective diagram of the assembled electric cylinder in accordance with the present disclosure.
Figure 4:
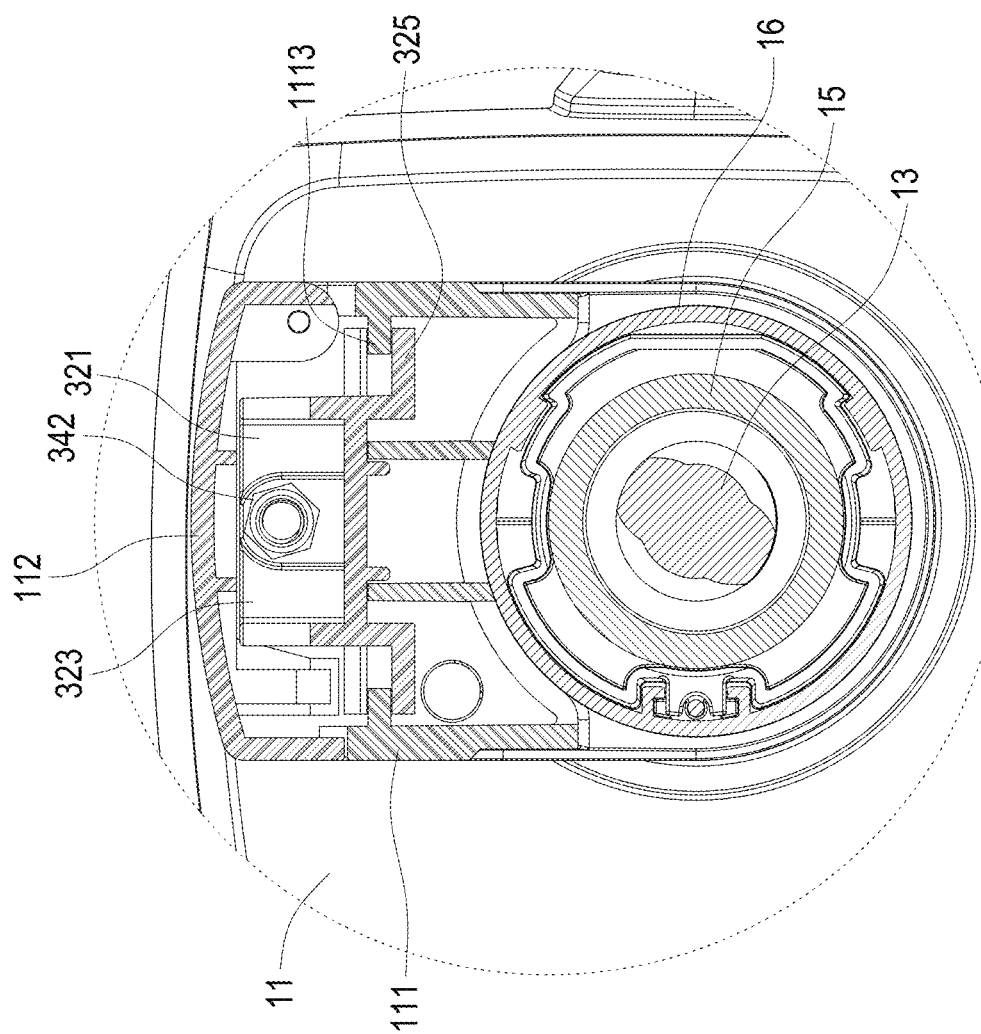
FIG. 4 is a schematic diagram of the cross-section of the electric cylinder in accordance with the present disclosure.

The technical contents of this disclosure will become apparent with the detailed description of embodiments accompanied with the illustration of related drawings as follows. It is intended that the embodiments and drawings disclosed herein are to be considered illustrative rather than restrictive.

Please refer to FIG. 1 to FIG. 12, the present disclosure provides an electric cylinder with a reminder function and a quick-release structure thereof. The electric cylinder 10 mainly includes an electric cylinder main body 1 and the quick-release structure 2. The quick-release structure 2 mainly includes a clutch 22, a clutch plate 23, a linkage rod component 3, a position sensor 4, and an alarm 5.

As shown in FIG. 1, FIG. 3 to FIG. 4, and FIG. 6 to FIG. 12, the electric cylinder main body 1 includes a case 11, an electric motor 12, a lead screw 13, a nut 14, a worm wheel 21, a telescopic tube 15 and an outer tube 16. The electric motor 12 and the lead screw 13 are disposed in the case 11. The electric motor 12 includes a worm gear 121. The lead screw 13 includes an external spiral tooth (outer thread) 131. The nut 14 is adapted to sheathe the lead screw 13 and in screw-driven transmission with an external spiral tooth 131 of the lead screw 13. The outer tube 16 is connected to the case 11. The telescopic tube 15 is sheathed to the nut 14, moves with the nut 14, and relatively telescopes to the outer tube 16. The worm wheel 21 is arranged in the case 11, disposed on a terminal of the lead screw 13, and engaging with the worm gear 121 to make the worm gear 121 be engaging with the worm wheel 21 and drive the worm wheel 21 to rotate.

As shown in FIG. 1 to FIG. 12, the quick-release structure 2 includes the clutch 22, the clutch plate 23, the linkage rod component 3, the position sensor 4, and the alarm 5. The clutch 22 and the clutch plate 23 are arranged in the case 11. The clutch 22 is adapted to sheathe and fix the lead screw 13 to rotate with the lead screw 13. The clutch plate 23 is adapted to sheathe the lead screw 13. The clutch plate 23 is configured to connect to the worm wheel 21, rotate with the worm wheel 21, and relatively move to the clutch 22. In other words, the clutch plate 23 is movably disposed between the worm wheel 21 and the clutch 22 to make the clutch plate 23 connect or separate from the clutch 22.

Moreover, the linkage rod component 3 is movably disposed on the case 11 and includes a pullable part 31 disposed on one end thereof. Another end of the linkage rod component 3 is fixed on the clutch plate 23. The linkage rod component 3 includes a sliding block 32 disposed between the pullable part 31 and the clutch plate 23. The pullable part 31 may drive the sliding block 32 to move through the linkage rod component 3 and drive the clutch plate 23 to separate from the clutch 22.

The linkage rod component 3 includes the sliding block 32, a rocker arm (swing arm) 33, a tie rod 34, and a (plurality of) rope-pull component(s) 35. The sliding block 32 is movably disposed on the electric cylinder main body 1 and arranged on the outer tube 16 out of the case 11. The rocker arm 33 is pivotally connected to the case 11 and a terminal of the rocker arm 33 is fixed on the clutch plate 23. One end of the tie rod 34 is fixed on one end of the sliding block 32 and another end of the tie rod 34 is fixed on the rocker arm 33. A (plurality of) rope-pull component(s) 35 is connected to another end of the sliding block 32 and partially exposed from an out of the sliding block 32 for a user to pull.

Detailed description is as follows, the quick-release structure 2 further includes a support box rack 111 disposed on the outer tube 16 and a box cover 112 pivotally connected to the support box rack 111 and covering the support box rack 111.

The support box rack 111 includes two first holes 1111 and a second hole 1112 respectively disposed on a front side and a backside.

The support box rack 111 includes two first slide rails 1113 extended from an inner periphery of a left side and a right side of the support box rack 111.

Moreover, the sliding block 32 of the embodiment includes a touch block 324 extended from a side of an outer periphery of the sliding block 32 and two second slide rails 325 respectively extended from a left side and a right side thereof. The two first slide rails 1113 are configured to respectively stop and limit a top of each of the two second slide rails 325 to make the sliding block 32 be stopped by the first slide rail 1113 and may be prevented from detaching from above the support box rack 111. As a result, the sliding block 32 may be stably and movably disposed in the support box rack 111. The support box rack 111 is disposed on the outer tube 16. In other words, the sliding block 32 is movably disposed on the support box rack 111.

Moreover, the sliding block 32 is defined with a container groove 321 and includes a front-side wall 322 and a back-side wall 323 arranged on two sides of the container groove 321. Two first perforations 3221 are defined on the front-side wall 322 and correspond to the two first holes 1111. A second perforation 3231 is defined on the back-side wall 323 and corresponds to the second hole 1112.

Moreover, the tie rod 34 includes a removable rod 341, a screw nut 342, a positioning element 343, and a reposition element 344. The screw nut 342 is arranged in the container groove 321. One end of the removable rod 341 is disposed through the second hole 1112 and the second perforation 3231 to screwed to the screw nut 342 and another end of the removable rod 341 is fixed on the rocker arm 33 to make the sliding block 32, the removable rod 341, and the rocker arm 33 be fixed together and move together. The positioning element 343 is fixed on the case 11 and disposed between the screw nut 342 and the rocker arm 33. The reposition element 344 is adapted to sheathe the removable rod 341 and elastically supported between the positioning element 343 and the rocker arm 33. The reposition element 344 of the embodiment is a coil spring, here is not intended to be limiting. The reposition element 344 is used to push the rocker arm 33 toward a position where the clutch plate 23 and the clutch 22 are connected to reset.

The rocker arm 33 of the embodiment is a U-shaped rocker arm 331, here is not intended to be limiting. A middle section of the U-shaped rocker arm 331 is fixed on the removable rod 341. Two terminals of the U-shaped rocker arm 331 are respectively fixed on two sides of the clutch plate 23. Two pivot points 3311 pivotally connected to the case 11 are defined between the middle section of the U-shaped rocker arm 331 and the two terminals of the U-shaped rocker arm 331. As a result, the removable rod 341 may drive the U-shaped rocker arm 331 to swing with two pivot points 3311 as the center to make the U-shaped rocker arm 331 to make the U-shaped rocker arm 331 pull the clutch plate 23 translation between the worm wheel 21 and the clutch 22.

The number of the rope-pull components 35 of the embodiment is two, here is not intended to be limiting. Each of the rope-pull components 35 includes a rope body 351 disposed through the first hole 1111 and the respective first perforation 3221, a lever 352 fixed on one end of the respective rope body 351, a stop block 353 fixed on another end of the respective rope body 351, and an elastic element 354 adapted to sheathe the respective rope body 351. Each of the levers 352 is disposed out of the support box rack 111. The support box rack 111 is disposed on the outer tube 16 out of the case 11. In other words, each of the levers 352 (part of the rope-pull component 35) is exposed from the support box rack 111 and defines the pullable part 31 available for users to pull. Each of the stop blocks 353 and each of the elastic elements 354 are arranged in the container groove 321 and each of the elastic elements 354 is elastically supported between each of the stop blocks 353 and the front side wall 322. As a result, when the lever 352 is pulled, the lever 352 may drive the rope body 351, the stop block 353, and the sliding block 32 to move in sequence. Then, the sliding block 32 drives the removable rod 341 to move. The elastic element 354 of the embodiment is a coil spring, here is not intended to be limiting. The elastic element 354 is used to pull the lever 352 toward a position abutting against the support box rack 111 to reset.

Furthermore, the position sensor 4 is disposed corresponding to the sliding block 32 and configured to sense a movement of the sliding block 32 and generate a displacement signal. The alarm 5 is configured to receive the displacement signal and send a warning. The position sensor 4 of the embodiment includes a micro switch 41 configured to sense being touched by the touch block 324 and generate the displacement signal, here is not intended to be limiting. The position sensor 4 may also be a capacitance sensor, a Hall effect sensor, an inductance sensor, a linear variable differential transformer (LVDT) sensor, a linear variable inductance transducer (LVIT) sensor, a magnetoresistive sensor, an optical sensor, or a resistive sensor. The alarm 5 is disposed on the support box rack 111, here is not intended to be limiting. The alarm 5 may also be disposed on an external control box or other area. The alarm 5 may be a warning light or a buzzer. The warning light emits a light warning after receiving the displacement signal. The buzzer emits an audible warning after receiving the displacement signal.

Figure 5:
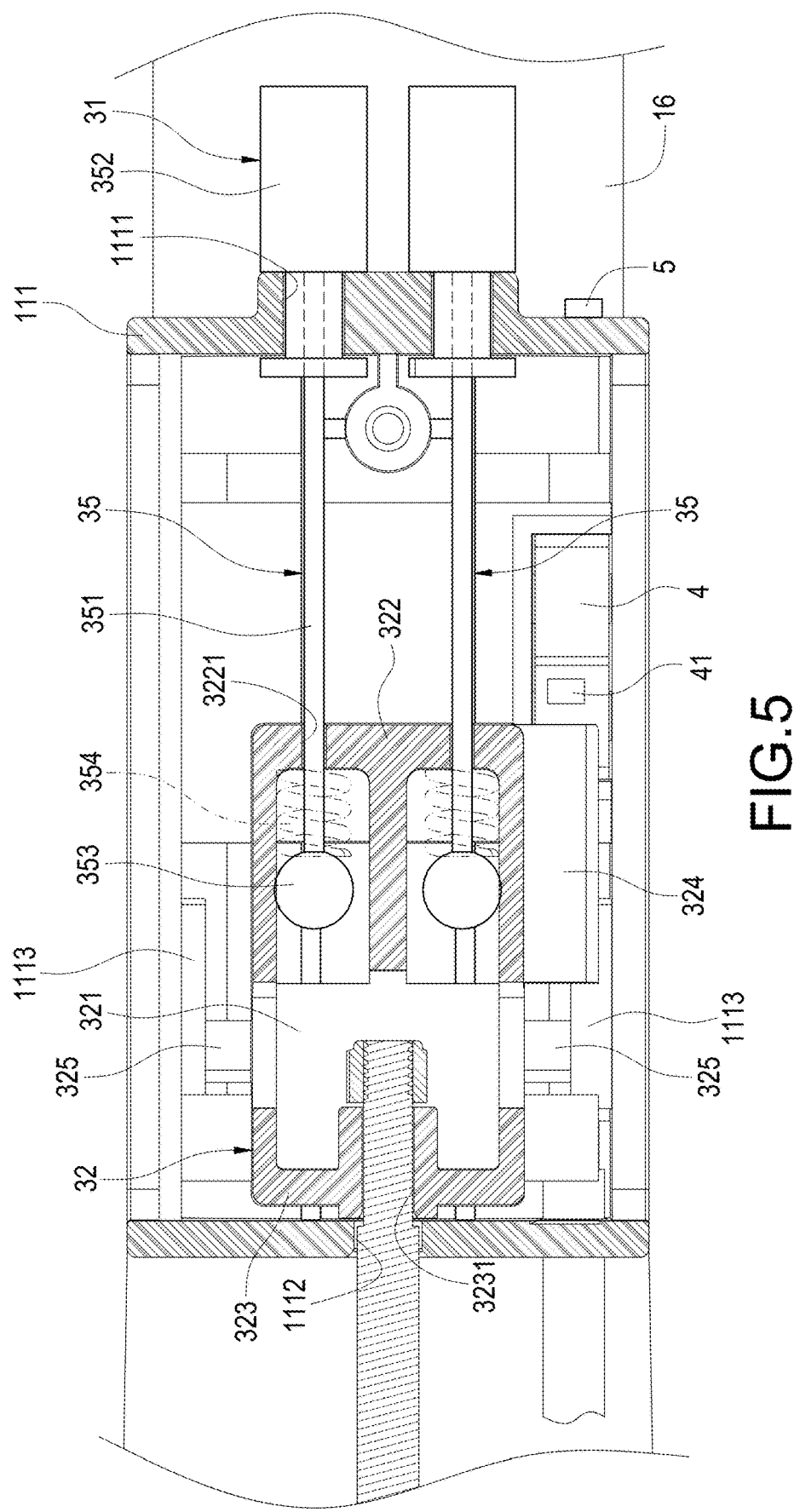
FIG. 5 is another schematic diagram of the cross-section of the electric cylinder in accordance with the present disclosure.
Figure 6:
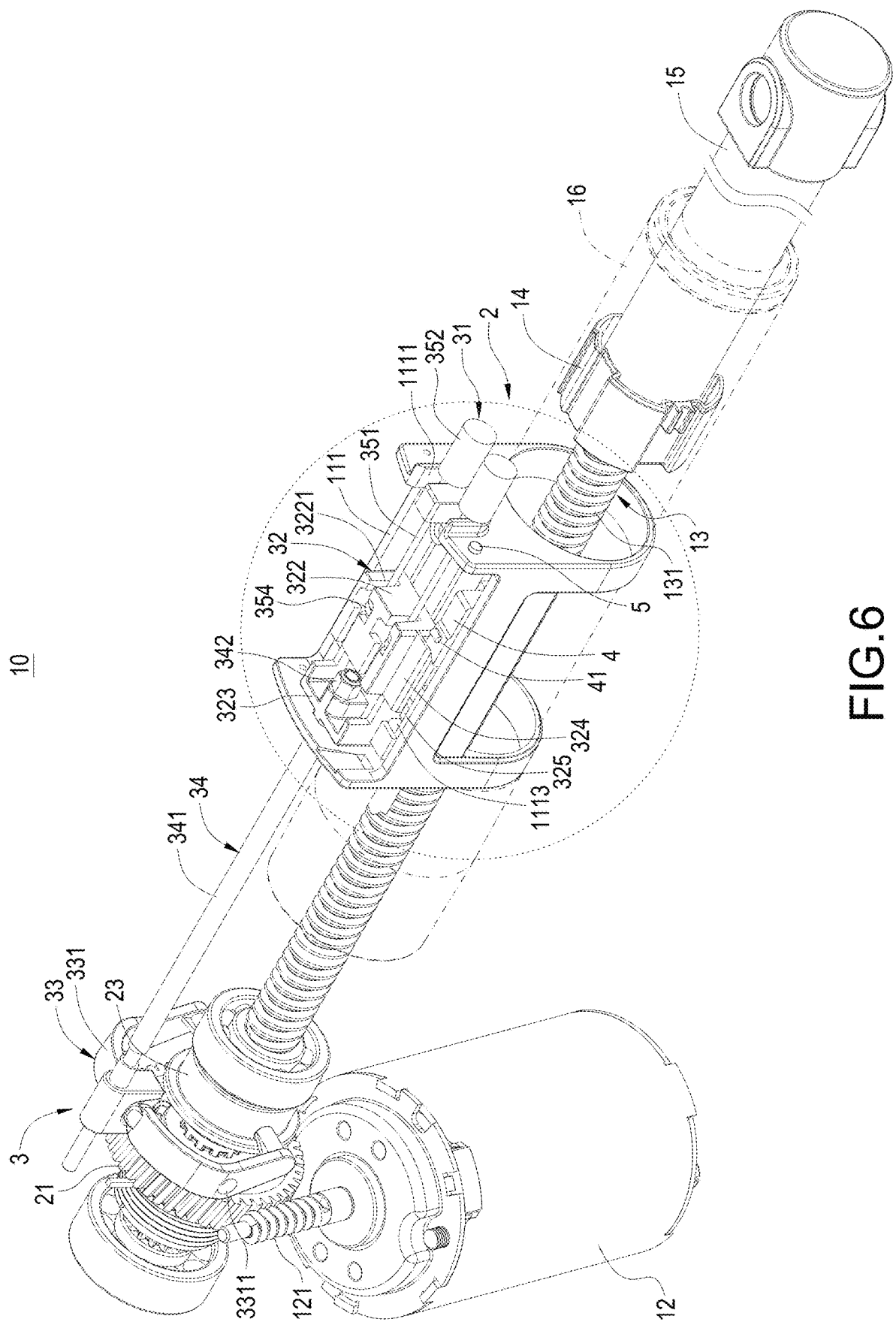
FIG. 6 is a perspective diagram of the electric cylinder in usage status in accordance with the present disclosure.
Figure 7:
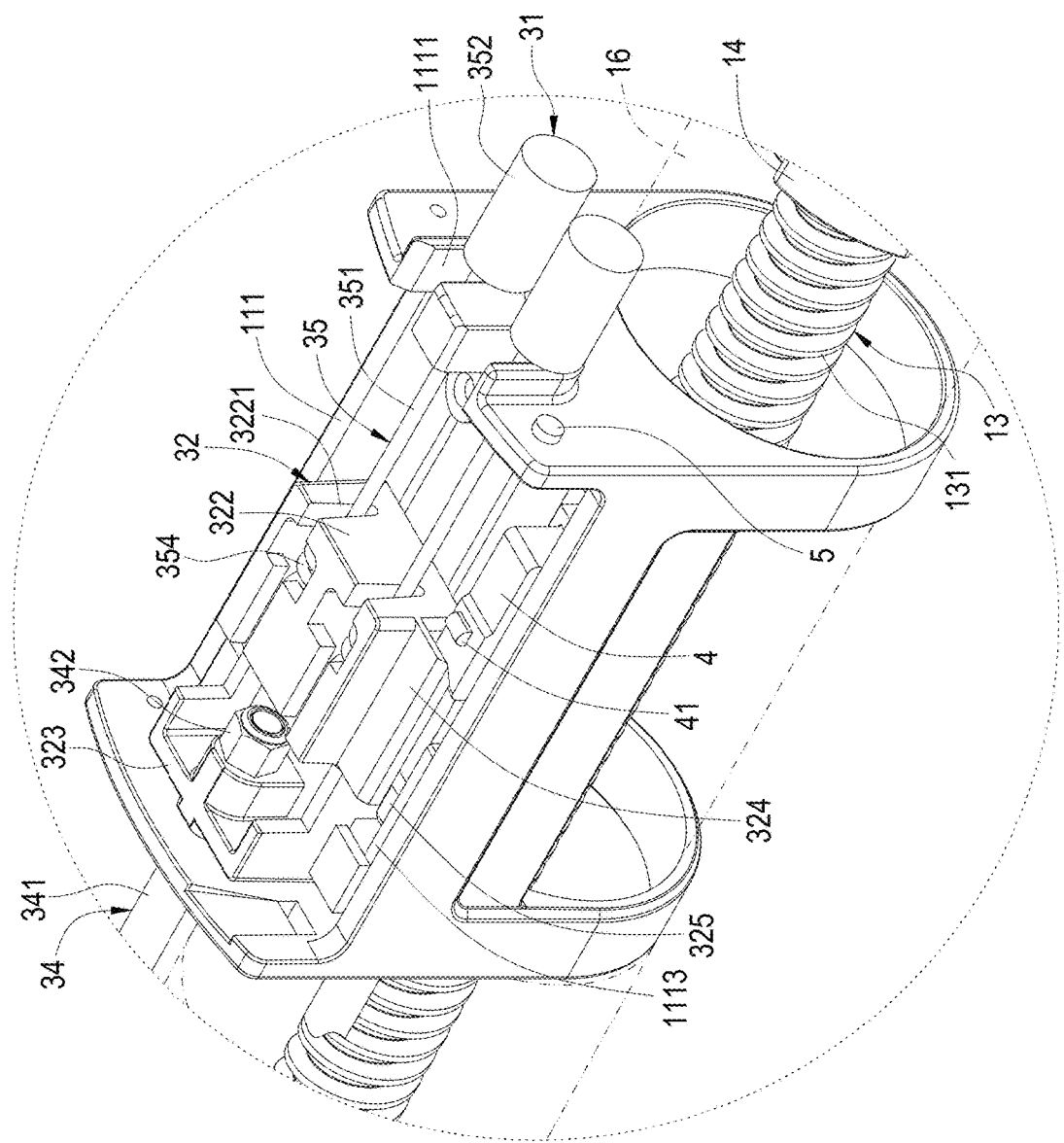
FIG. 7 is a partially enlarged schematic diagram of the electric cylinder in accordance with the present disclosure.
Figure 8:
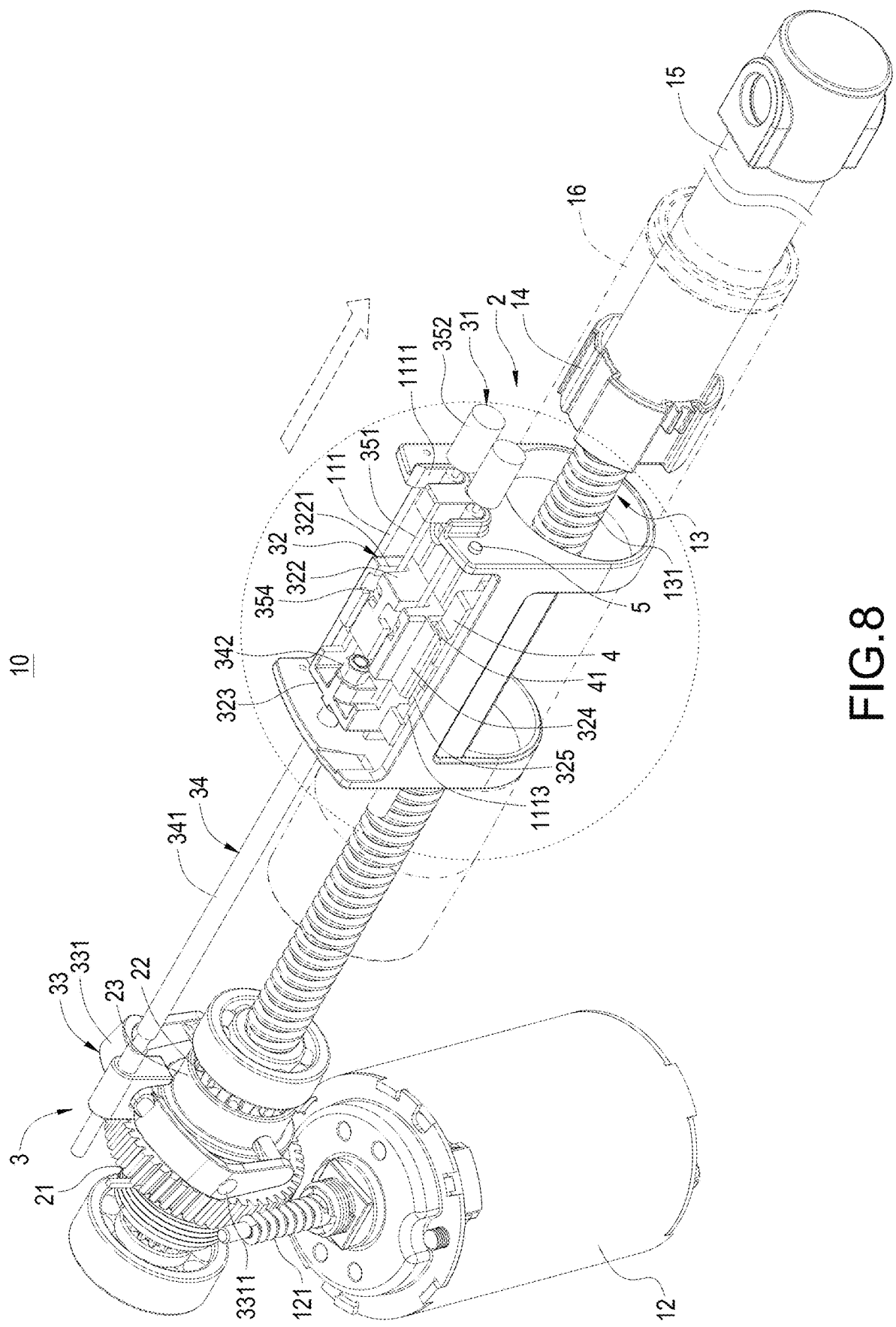
FIG. 8 is a perspective schematic diagram showing the lever being pulled in accordance with the present disclosure.
Figure 9:
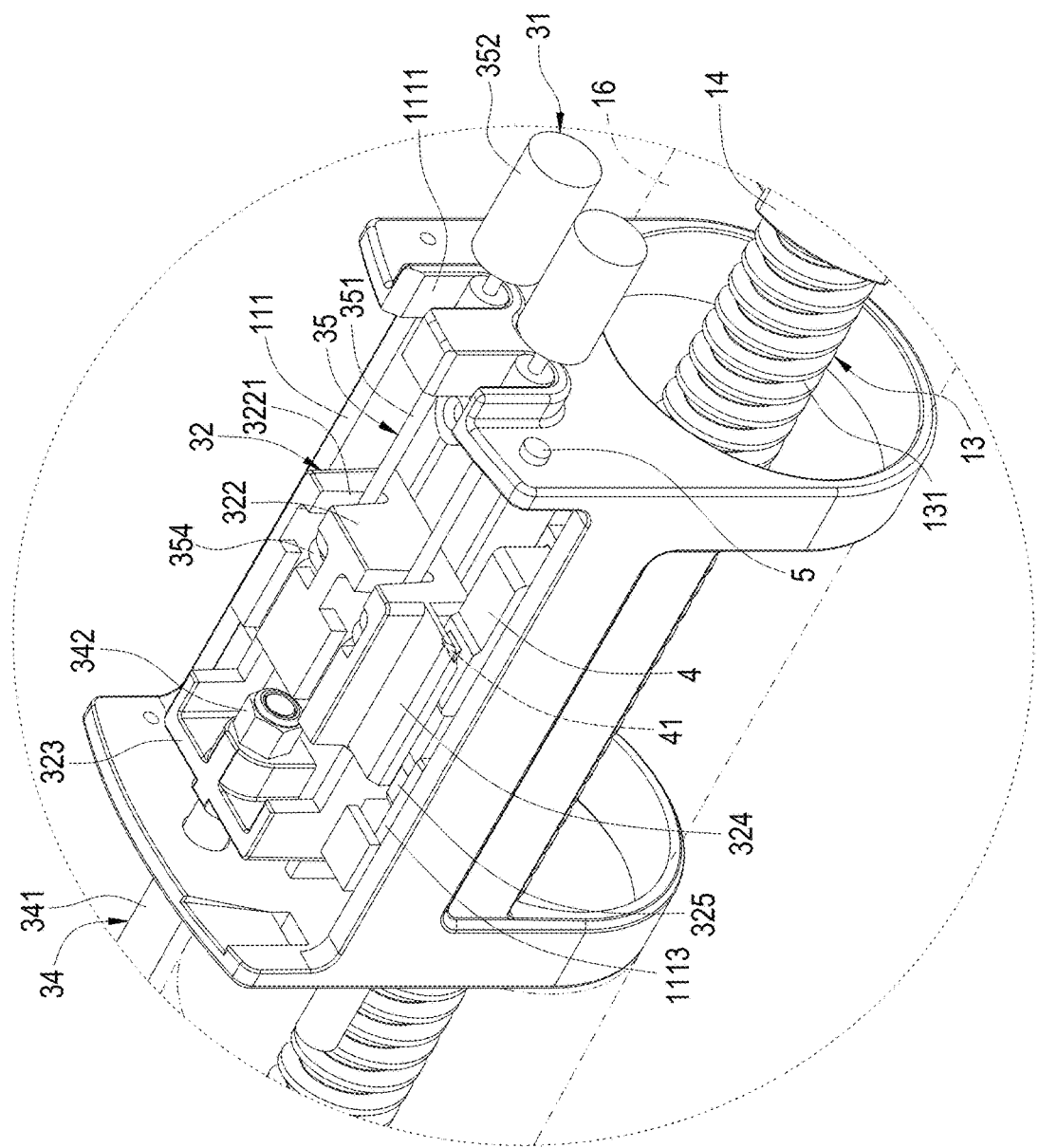
FIG. 9 is a perspective diagram showing the sliding block touching the micro switch in accordance with the present disclosure.
Figure 10:
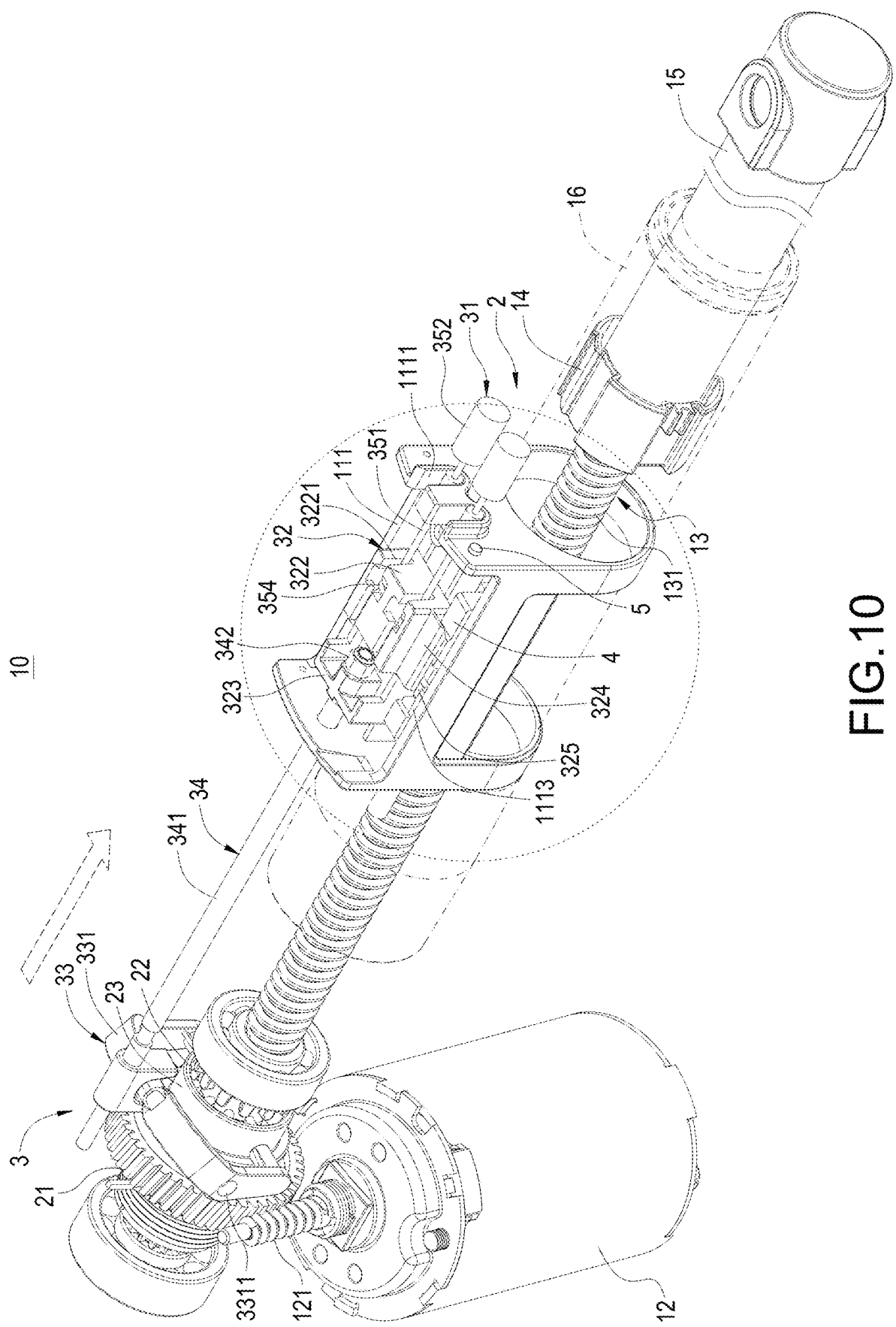
FIG. 10 is a perspective schematic diagram showing the electric cylinder ready for the quick-release of the telescopic tube in accordance with the present disclosure.
Figure 11:
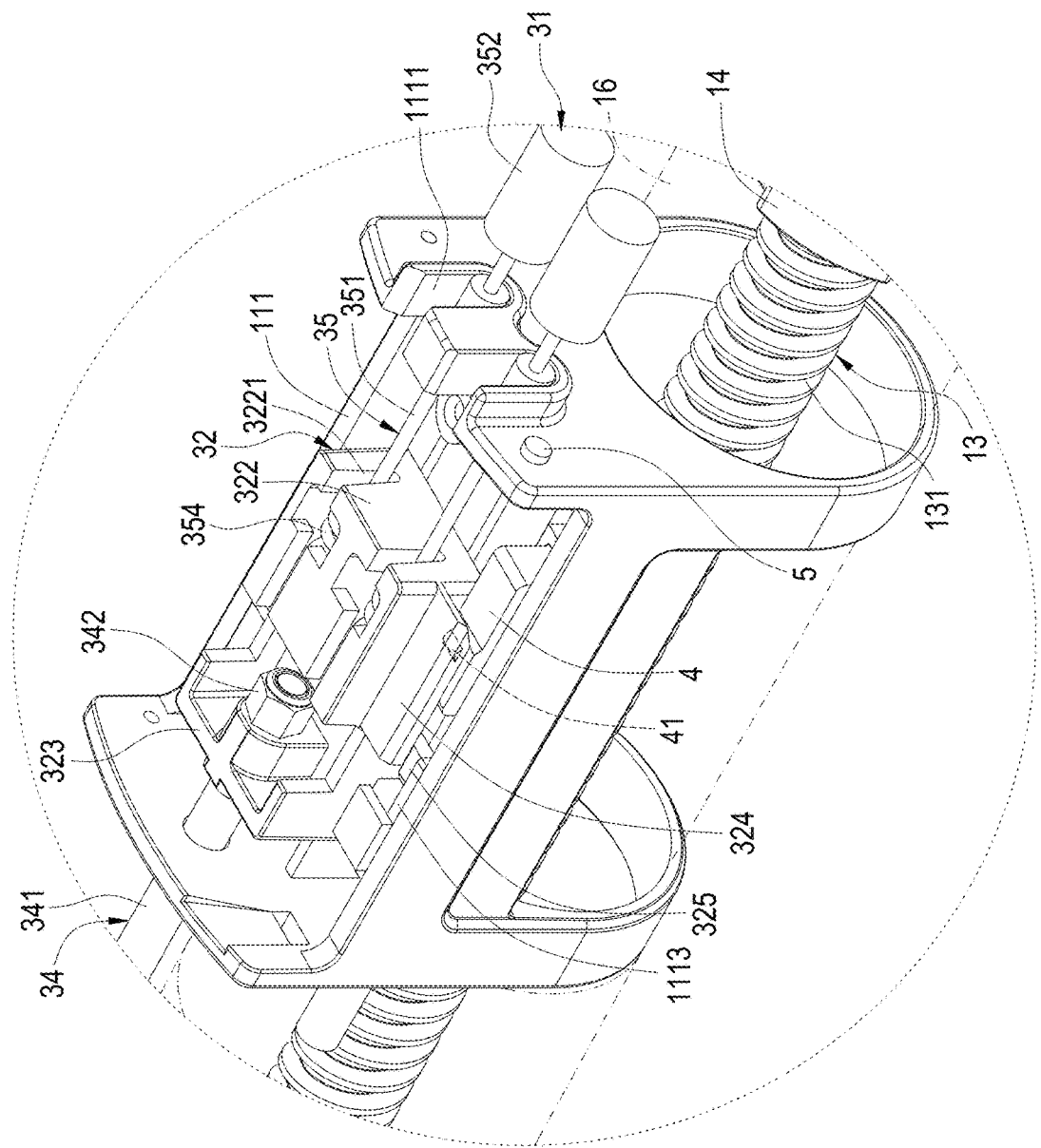
FIG. 11 is a perspective schematic diagram showing the sliding block continuing to displace in accordance with the present disclosure.
Figure 12:
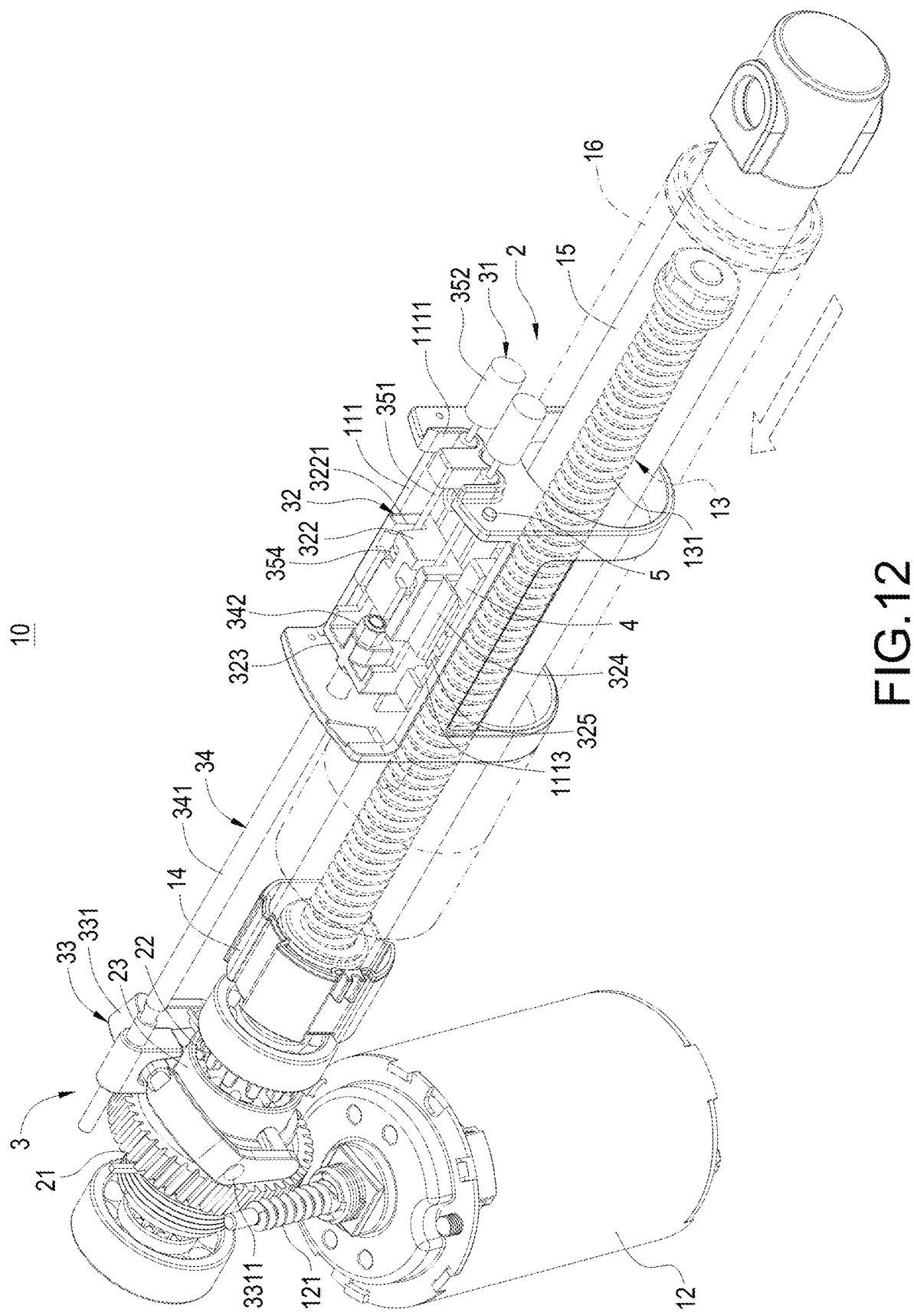
FIG. 12 is a perspective schematic diagram showing the electric cylinder quick-releasing the telescopic tube in accordance with the present disclosure.

As shown in FIGS. 5 to 12 which are the usage states of the electric cylinder 10 and the quick-release structure 2 of the present disclosure. First, as shown in FIG. 5 to FIG. 7, when the electric cylinder 10 is used to adjust a height or an elevation angle of the general position, the worm wheel 21 is connected to the clutch 22 through the clutch plate 23 to make the worm gear 121 drive the lead screw 13 to rotate through the worm wheel 21, the clutch plate 23, the clutch 22 in sequence. The lead screw 13 then drives the telescopic tube 15 to relatively telescope to the outer tube 16 through the nut 14.

Furthermore, as shown in FIG. 8 to FIG. 12, when a user needs the electric cylinder 10 to be quick-release or reset, the user may pull the lever 352. The lever 352 drives the rope body 351, the stop block 353, the sliding block 32, the removable rod 341, and the rocker arm 33 in sequence to move. The rocker arm 33 moves the clutch plate 23 and the clutch 22 to separate from each other to make the lead screw 13 not be controlled by the worm gear 121 but be pulled by the gravity of the nut 14 and rotate freely. As a result, the telescopic tube 15 may quickly retract in the outer tube 16, and the electric cylinder 10 and the quick-release structure 2 having the function of the quick-reset the telescopic tube 15 of the present disclosure may be achieved.

Moreover, the process of pulling the lever 352 may be performed by the stop block 353 driving the sliding block 32 to move, and then driving the clutch plate 23 and the clutch 22 to separate from each other. Before the rocker arm 33 is moved to separate the clutch plate 23 and the clutch 22 from each other, the touch block 324 of the sliding block 32 touches the micro switch 41 to make the position sensor 4 be triggered by the sliding block 32 and generate a displacement signal. The alarm 5 emits a warning immediately after receiving the displacement signal. As a result, the electric cylinder 10 and the quick-release structure 2 with the function of starting an early warning before the quick-release of the present disclosure may be achieved.

In summary, the electric cylinder with the reminder function and the quick-release structure thereof of the present disclosure may achieve the intended purpose of use and solve the problem of the related-art, has industrial applicability, novelty, and non-obviousness, meets the requirements of patent application, and may be applied in accordance with the patent act to protect the rights of the creator(s).

What is claimed is:

1. A quick-release structure (2) with a reminder function, disposed on an electric cylinder (10), the electric cylinder (10) comprising a case (11), a lead screw (13), a worm gear (121), and a worm wheel (21), the worm wheel (21) disposed on a terminal of the lead screw (13) and engaging with the worm gear (121), the quick-release structure (2) comprising:
   a clutch (22), adapted to sheathe and fix the lead screw (13), and configured to rotate with the lead screw (13);
   a clutch plate (23), configured to connect to the worm wheel (21), rotate with the worm wheel (21), and relatively move to the clutch (22) to connect or separate from the clutch (22);
   a linkage rod component (3), movably disposed on the case (11) and comprising a pullable part (31) disposed on one end thereof, another end of the linkage rod component (3) fixed on the clutch plate (23), the linkage rod component (3) comprising a sliding block (32) disposed between the pullable part (31) and the clutch plate (23), the pullable part (31) configured to drive the sliding block (32) to move through the linkage rod component (3) and drive the clutch plate (23) to separate from the clutch (22);
   a position sensor (4), disposed corresponding to the sliding block (32), and configured to sense a movement of the sliding block (32) and generate a displacement signal; and
   an alarm (5), configured to receive the displacement signal and send a warning.

2. The quick-release structure (2) with a reminder function of claim 1, wherein the sliding block (32) comprises:
   a touch block (324), extended from the sliding block (32);
   the position sensor (4) comprises:
   a micro switch (41), configured to sense being touched by the touch block (324) and generate the displacement signal.

3. The quick-release structure (2) with a reminder function of claim 1, wherein the linkage rod component (3) comprises: the sliding block (32), a rocker arm (33), a tie rod (34), and at least one rope-pull component (35);

the sliding block (32) is movably disposed on the electric cylinder (10) and arranged out of the case (11);

the rocker arm (33) is pivotally connected to the case (11) and a terminal of the rocker arm (33) is fixed on the clutch plate (23);

one end of the tie rod (34) is fixed on one end of the sliding block (32), and another end of the tie rod (34) is fixed on the rocker arm (33); and the at least one rope-pull component (35) is connected to another end of the sliding block (32) and partially exposed from the sliding block (32).

4. The quick-release structure (2) with a reminder function of claim 3, wherein a number of the rope-pull components (35) is two;

the sliding block (32) comprises a container groove (321) defined thereon, a front side wall (322) and a back-side wall (323) arranged on two sides of the container groove (321);

two first perforations (3221) are defined on the front-side wall (322); and each of the rope-pull components (35) comprises:
a rope body (351), disposed through the respective first perforation (3221);
a lever (352), fixed on one end of the respective rope body (351);
a stop block (353), fixed on another end of the respective rope body (351); and
an elastic element (354), adapted to sheathe the respective rope body (351);
each of the levers (352) exposed from the sliding block (32) defines the pullable part (31);
each of the stop blocks (353) and each of the elastic elements (354) are arranged in the container groove (321) and each of the elastic elements (354) is elastically supported between each of the stop blocks (353) and the front side wall (322).

5. The quick-release structure (2) with a reminder function of claim 4, wherein a second perforation (3231) is defined on the back-side wall (323);

the tie rod (34) comprises a removable rod (341) and a screw nut (342);

one end of the removable rod (341) is disposed through the second perforation (3231) and screwed to the screw nut (342); and another end of the removable rod (341) is fixed on the rocker arm (33).

6. The quick-release structure (2) with a reminder function of claim 5, wherein the linkage rod component (3) further comprises:

a support box rack (111), disposed out of the case (11); and a box cover (112), pivotally connected to the support box rack (111) and covering the support box rack (111);

the support box rack (111) comprises two first slide rails (1113) extended from thereof;

the sliding block (32) is movably arranged in the support box rack (111);

the sliding block (32) comprises two second slide rails (325) respectively extended from a left side and a right side thereof;

the two first slide rails (1113) are configured to respectively stop and limit a top of each of the two second slide rails (325);

the position sensor (4) is arranged in the support box rack (111);

two first holes (1111) are defined on the support box rack (111) and configured to correspond to the two first perforations (3221) and be disposed through by the respective rope body (351);

a second hole (1112) is defined on the support box rack (111) and configured to correspond to the second perforation (3231) and be disposed through by the removable rod (341); and each of the levers (352) is disposed out of the support box rack (111).

7. The quick-release structure (2) with a reminder function of claim 5, wherein the tie rod (34) further comprises:

a positioning element (343) and a reposition element (344);

the positioning element (343) is fixed on the case (11) and disposed between the screw nut (342) and the rocker arm (33); and the reposition element (344) is adapted to sheathe the removable rod (341) and elastically supported between the positioning element (343) and the rocker arm (33).

8. The quick-release structure (2) with a reminder function of claim 5, wherein the rocker arm (33) is a U-shaped rocker arm (331);

a middle section of the U-shaped rocker arm (331) is fixed on the removable rod (341);

two terminals of the U-shaped rocker arm (331) are respectively fixed on two sides of the clutch plate (23); and two pivot points (3311) pivotally connected to the case (11) are defined between the middle section of the U-shaped rocker arm (331) and the two terminals of the U-shaped rocker arm (331).

9. An electric cylinder (10) with a reminder function, comprising:

an electric cylinder main body (1) comprising a case (11) and an electric motor (12), a lead screw (13), and a worm wheel (21) disposed in the case (11), the electric motor (12) comprising a worm gear (121), the worm wheel (21) disposed on a terminal of the lead screw (13) and engaging with the worm gear (121); and a quick-release structure (2), comprising:
a clutch (22), adapted to sheathe and fix the lead screw (13), and configured to rotate with the lead screw (13);
a clutch plate (23), configured to connect to the worm wheel (21), rotate with the worm wheel (21), and relatively move to the clutch (22) to connect or separate from the clutch (22);
a linkage rod component (3), movably disposed on the case (11) and comprising a pullable part (31) disposed on one end thereof, another end of the linkage rod component (3) fixed on the clutch plate (23), the linkage rod component (3) comprising a sliding block (32) disposed between the pullable part (31) and the clutch plate (23), the pullable part (31) configured to drive the sliding block (32) to move through the linkage rod component (3) and drive the clutch plate (23) and the worm wheel (21) to separate from the clutch (22);
a position sensor (4), disposed corresponding to the sliding block (32), and configured to sense a movement of the sliding block (32) and generate a displacement signal; and
an alarm (5), configured to receive the displacement signal and send a warning.

10. The electric cylinder (10) with a reminder function of claim 9, wherein the sliding block (32) comprises:
a touch block (324), extended from the sliding block (32);
the position sensor (4) comprises:

a micro switch (41), configured to sense being touched by the touch block (324) and generate the displacement signal.

11. The electric cylinder (10) with a reminder function of claim 9, wherein the linkage rod component (3) comprises: the sliding block (32), a rocker arm (33), a tie rod (34), and at least one rope-pull component (35);
   the sliding block (32) is movably disposed on the electric cylinder main body (1) and arranged out of the case (11);
   the rocker arm (33) is pivotally connected to the case (11) and a terminal of the rocker arm (33) is fixed on the clutch plate (23);
   one end of the tie rod (34) is fixed on one end of the sliding block (32), and another end of the tie rod (34) is fixed on the rocker arm (33); and
   the at least one rope-pull component (35) is connected to another end of the sliding block (32) and partially exposed from the sliding block (32).

12. The electric cylinder (10) with a reminder function of claim 11, wherein a number of the rope-pull components (35) is two;
   the sliding block (32) comprises a container groove (321) defined thereon, a front side wall (322) and a back-side wall (323) arranged on two sides of the container groove (321);
   two first perforations (3221) are defined on the front-side wall (322); and
   each of the rope-pull components (35) comprises:
      a rope body (351), disposed through the respective first perforation (3221);
      a lever (352), fixed on one end of the respective rope body (351);
      a stop block (353), fixed on another end of the respective rope body (351); and
      an elastic element (354), adapted to sheathe the respective rope body (351);
   each of the levers (352) exposed from the sliding block (32) defines the pullable part (31);
   each of the stop blocks (353) and each of the elastic elements (354) are arranged in the container groove (321) and each of the elastic elements (354) is elastically supported between each of the stop blocks (353) and the front side wall (322).

13. The electric cylinder (10) with a reminder function of claim 12, wherein a second perforation (3231) is defined on the back-side wall (323);
   the tie rod (34) comprises a removable rod (341) and a screw nut (342);
   one end of the removable rod (341) is disposed through the second perforation (3231) and screwed to the screw nut (342); and
   another end of the removable rod (341) is fixed on the rocker arm (33).

14. The electric cylinder (10) with a reminder function of claim 13, wherein the linkage rod component (3) further comprises:
   a support box rack (111), disposed out of the case (11); and
   a box cover (112), pivotally connected to the support box rack (111) and covering the support box rack (111);
   the support box rack (111) comprises two first slide rails (1113) extended from thereof;
   the sliding block (32) is movably arranged in the support box rack (111);
   the sliding block (32) comprises two second slide rails (325) respectively extended from a left side and a right side thereof;
   the two first slide rails (1113) are configured to respectively stop and limit a top of each of the two second slide rails (325);
   the position sensor (4) is arranged in the support box rack (111);
   two first holes (1111) are defined on the support box rack (111) and configured to correspond to the two first perforations (3221) and be disposed through by the respective rope body (351);
   a second hole (1112) is defined on the support box rack (111) and configured to correspond to the second perforation (3231) and be disposed through by the removable rod (341); and
   each of the levers (352) is disposed out of the support box rack (111).

15. The electric cylinder (10) with a reminder function of claim 13, wherein the tie rod (34) further comprises:
   a positioning element (343) and a reposition element (344);
   the positioning element (343) is fixed on the case (11) and disposed between the screw nut (342) and the rocker arm (33);
   the reposition element (344) is adapted to sheathe the removable rod (341) and elastically supported between the positioning element (343) and the rocker arm (33).

16. The electric cylinder (10) with a reminder function of claim 13, wherein the rocker arm (33) is a U-shaped rocker arm (331);
   a middle section of the U-shaped rocker arm (331) is fixed on the removable rod (341);
   two terminals of the U-shaped rocker arm (331) are respectively fixed on two sides of the clutch plate (23); and
   two pivot points (3311) pivotally connected to the case (11) are defined between the middle section of the U-shaped rocker arm (331) and the two terminals of the U-shaped rocker arm (331).

* * * * *